(12) United States Patent
Mori et al.

(10) Patent No.: US 11,467,790 B2
(45) Date of Patent: Oct. 11, 2022

(54) IMAGE PROCESSING APPARATUS AND SETTING DATA MANAGEMENT SYSTEM

(71) Applicant: BROTHER KOGYO KABUSHIKI KAISHA, Nagoya (JP)

(72) Inventors: Kosuke Mori, Handa (JP); Yoshi Hirasawa, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/370,322

(22) Filed: Jul. 8, 2021

(65) Prior Publication Data
US 2022/0035585 A1    Feb. 3, 2022

(30) Foreign Application Priority Data

Jul. 31, 2020  (JP) .............................. JP2020-131053
Jul. 31, 2020  (JP) .............................. JP2020-131055

(51) Int. Cl.
*G06F 3/12* (2006.01)

(52) U.S. Cl.
CPC ............ *G06F 3/1257* (2013.01); *G06F 3/121* (2013.01); *G06F 3/1203* (2013.01); *G06F 3/1236* (2013.01); *G06F 3/1258* (2013.01); *G06F 3/1285* (2013.01)

(58) Field of Classification Search
CPC .... G06F 3/1257; G06F 3/1203; G06F 3/1258; G06F 3/1236; G06F 3/121; G06F 3/1285

USPC .............................................. 358/1.14, 1.15
See application file for complete search history.

(56) References Cited

U.S. PATENT DOCUMENTS

| | | | |
|---|---|---|---|
| 2012/0127525 A1 | 5/2012 | Uchibori et al. | |
| 2015/0373216 A1* | 12/2015 | Maeda ............... | H04N 1/00931 358/1.14 |
| 2015/0381827 A1* | 12/2015 | Kambegawa ...... | H04N 1/32101 358/1.15 |
| 2016/0072972 A1* | 3/2016 | Akuzawa ........... | H04N 1/00506 358/1.13 |
| 2020/0073603 A1* | 3/2020 | Kaneda ................. | G06F 3/1273 |

FOREIGN PATENT DOCUMENTS

| | | |
|---|---|---|
| JP | 2008-072318 A | 3/2008 |
| JP | 2012-114567 A | 6/2012 |

* cited by examiner

*Primary Examiner* — Allen H Nguyen
(74) *Attorney, Agent, or Firm* — Scully, Scott, Murphy & Presser, PC

(57) ABSTRACT

The image forming apparatus according aspects of the present disclosure includes an image processor, a storage, a network interface and a controller. The controller is configured to update, at the setting update time, setting data and update the setting update time in response to completion of update of the setting data. Further, the controller is configured to determine, at a connection start time when a connection between the network interface and a server is established, whether the connection start time is later than the setting update time, and, when the connection start time is later than the setting update time, update the setting data, otherwise not update the setting data.

13 Claims, 10 Drawing Sheets

<Change History Log>

| Date | Time | Change Item | Change Parameter | Before Change | After Change |
|---|---|---|---|---|---|
| April 10, 2020 | 10:00:00 | Network Setting | Connection | OFF | ON |
| April 11, 2020 | 14:30:00 | Administrator Setting | Setting Lock | ON | OFF |
| April 11, 2020 | 17:00:00 | Shortcut Setting | Icon 5 | — | Service |
| ... | ... | ... | ... | ... | ... |

FIG. 10A

<Version Information>

| File Name of Applied Update Data File | setting.zip |
|---|---|
| Update Date of Applied Update Data File | April 8, 2020, 10:00 |

FIG. 10B

IMAGE PROCESSING APPARATUS AND SETTING DATA MANAGEMENT SYSTEM

CROSS-REFERENCE TO RELATED APPLICATIONS

This application claims priority under 35 U.S.C. § 119 from Japanese Patent Applications No. 2020-131053 and No. 2020-131055, both filed on Jul. 31, 2020. The entire subject matters of the applications are incorporated herein by reference.

BACKGROUND

Technical Field

The present disclosures relate to an image processing apparatus and a setting data management system.

Related Art

There has been known a setting data management system which is configured as follows. When an image forming apparatus transmits a setting information obtaining request to a server, the server transmits the setting information to an image forming apparatus. Then, as the image forming apparatus registers the transmitted setting information in the image forming apparatus itself, thereby the image forming apparatus enabling itself to operate based on the setting information.

SUMMARY

In order to reduce a communication load with the server, there has been developed an image forming apparatus which is configured to receive data to update the setting information every time when an update interval, which has been defined in advance, has elapsed.

However, if the image forming apparatus is unable to obtain update data to update for some reason at a timing of obtaining the data for an update, the image forming apparatus will not be able to update the setting information until a next request timing of requesting the update date. In particular, if the interval for updating the setting information is relatively long, such as one week or one month, the image forming apparatus that fails to update the setting information once will remain operating in the old settings for a long time.

According to aspects of the present disclosures, there is provided an image processing apparatus, comprising an image processor, a storage, a network interface, and a controller. The controller is configured to perform updating, at setting update time, setting data stored in the storage using update data obtained from a server which is connected to the image processing apparatus via the network interface, the storage being configured to store the setting data, the controller being configured to control the image processor in accordance with a setting represented by the setting data, the server storing the update data to be used to update the setting data, the storage storing the setting update time representing a time at which the controller is to update the setting data, the updated setting data being used by the controller to control the image processor after completion of update of the setting data. Further, the controller is configured to perform updating the setting update time in response to completion of update of the setting data at the setting update time, determining, at a connection start time when a connection between the network interface and the server is established, whether the connection start time is later than the setting update time, when the connection start time is later than the setting update time, updating the setting data using the update data obtained from the server at the connection start time, and when the connection start time is not later than the setting update time, not updating the setting data at the connection start time.

According to aspects of the present disclosures, there is provided a setting data management system comprising a server, an image processor, a storage, a network interface, and, an image processing apparatus including a controller. The controller is configured to perform updating, at setting update time, setting data stored in the storage using update data obtained from the server which is connected to the image processing apparatus via the network interface, the storage being configured to store the setting data, the controller being configured to control the image processor in accordance with a setting represented by the setting data, the server storing the update data to be used to update the setting data, the storage storing the setting update time representing a time at which the controller is to update the setting data, the updated setting data being used by the controller to control the image processor after completion of update of the setting data. Further, the controller is configured to perform updating the setting update time in response to completion of update of the setting data at the setting update time, determining, at a connection start time when a connection between the network interface and the server is established, whether the connection start time is later than the setting update time, when the connection start time is later than the setting update time, updating the setting data using the update data obtained from the server at the connection start time, and when the connection start time is not later than the setting update time, not updating the setting data at the connection start time.

According to aspects of the present disclosures, there is provided an image processing apparatus, comprising an image processor, a storage, a network interface, and a controller. The controller is configured to perform updating setting data stored in the storage using update data obtained from the server which is connected to the image processing apparatus via the network interface at a particular updating interval set in advance, the storage being configured to store the setting data, the controller being configured to control the image processor in accordance with a setting represented by the setting data, the server storing the update data to be used to update the setting data, the updated setting data being used by the controller to control the image processor after completion of update of the setting data. Further, the controller is configured to perform determining whether the setting data is changed by a user during the particular updating interval, and updating the setting data using the update data when determining that the setting data is changed by the user during the particular updating interval.

BRIEF DESCRIPTION OF THE DRAWINGS

FIG. 10A shows a change history log and FIG. 10B shows version information.

DETAILED DESCRIPTION OF THE EMBODIMENTS

First Embodiment

Setting Data Management System

Hereinafter, embodiments of the present disclosures will be described with reference to the drawings.

Figure 1:
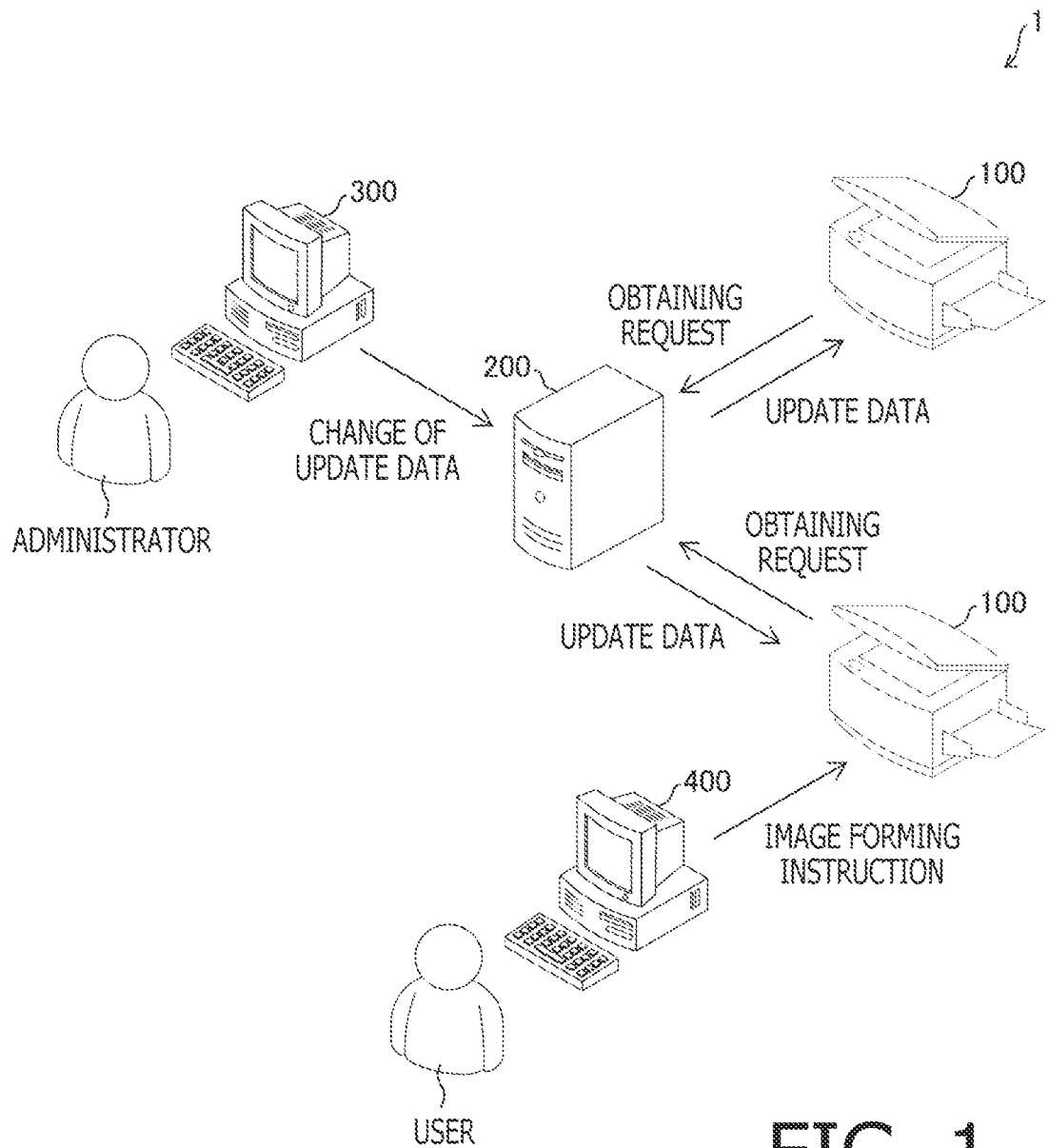
FIG. 1 schematically shows a configuration of a setting data management system according to aspects of the present disclosures.

FIG. 1 schematically shows a configuration of a setting data management system 1 according to a first embodiment of the present disclosures.

The setting data management system 1 is a system configured to manage settings related to image processing of image processing apparatuses. In this embodiment, as an example of an image processing apparatus, an image forming apparatus 100 configured to perform image formation will be described. Image formation is an example of image processing.

The setting data management system 1 shown in FIG. 1 includes at least the image forming apparatus 100 configured to perform image processing, and a server 200. The image forming apparatus 100 and the server 200 are connected through a network. In the example shown in FIG. 1, the setting data management system 1 further includes an information processing apparatus 300 for an administrator, which is configured to access the server 200, and an information processing apparatus 400.

Incidentally, it is noted that the information processing apparatus 300 and the information processing apparatus 400 are not essential apparatuses in the setting data management system 1. In the example shown in FIG. 1, the setting data management system 1 includes two image forming apparatuses 100, but it is only necessary that the setting data management system 1 includes at least one image forming apparatus 100. In addition, the information processing apparatus 300 and the information processing apparatus 400 may be the same. In other words, the information processing apparatus 300 or the information processing apparatus 400 may be a single apparatus that can access both the image forming apparatus 100 and the server 200.

Each of the image forming apparatuses 100 stores setting data 121 and a setting update time 122. The setting data is data that indicates the settings for controlling image processing. That is, in this embodiment, the setting data 121 is data that indicates the settings for image formation performed by the image forming apparatus 100. The setting update time is a time at which the setting data is scheduled to be updated in the image forming apparatus 100. The setting update time is not just a time but may include information on the date (e.g., year, month and date) as well as the time. The server 200 is configured to store update data. The update data is the data used to update at least a part of the setting data.

The information processing apparatus 300 is configured to create the update data and transmits (uploads) the update data to the server 200 in response to an operation of an administrator of the setting data management system 1. The information processing apparatus 400 is configured to transmit image forming instructions to the image forming apparatus 100 in response to the operation of the user of the image forming apparatus 100. The image formation instruction is, for example, a print job that includes data of an image to be printed (i.e., to be formed) and information specifying the number of copies to be printed.

The image forming apparatus 100 is configured to store the setting data. In the image forming apparatus 100, an update of the setting data is performed by rewriting at least a part of the setting data using the update data. The administrator of the setting data management system 1 may cause the server 200 to store the new update data through the information processing apparatus 300. In other words, the administrator may be able to add or change the update data stored in the server 200.

In the setting data management system 1, each of the image forming apparatuses 100 is configured to refer to the setting data and accesses, by itself, the server 200 to obtain the latest update data. Then, in the respective image forming apparatuses 100, the update data is applied and the stored setting data is automatically updated. An operation of such image forming apparatuses 100 will be described in detail later.

Image Forming Apparatus

The image forming apparatus 100 is an apparatus configured to form and fix an image on a recording medium. The recording medium typically has a sheet shape. A concrete example of the image forming apparatus 100 is an electrophotographic image forming apparatus. However, the image forming apparatus 100 may also be one employing other method such as an inkjet method.

Figure 2:
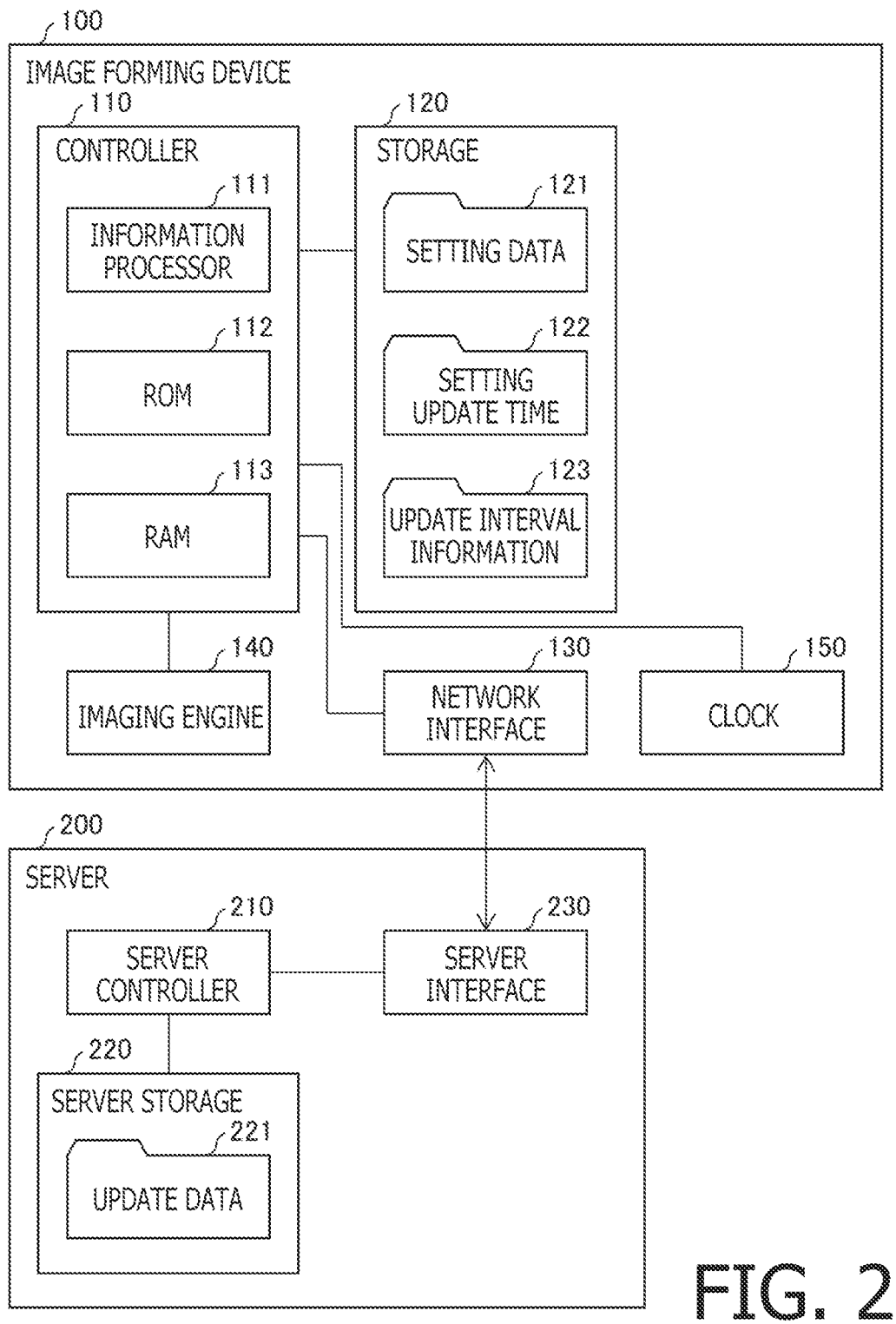
FIG. 2 is a block diagram of an image forming apparatus and a server included in the setting data management system shown in FIG. 1.

FIG. 2 is a block diagram showing a schematic configuration of the image forming apparatus 100 and the server 200. The image forming apparatus 100 is equipped with a controller 110, a storage 120, a network interface 130, and an imaging engine 140 (image processor). The imaging engine 140 is a mechanical unit that executes image formation. In the present embodiment, the imaging engine 140 forms and fixes an image on a recording medium. The imaging engine 140 is, for example, a print engine configured to print an image on the recording medium in accordance with the print job. A printing method employed by the imaging engine 140 is, for example, an electrophotographic printing method. An inkjet printing method may be employed the imaging engine 140.

The controller 110 is configured to control the imaging engine 140, in accordance with image forming instructions from the information processing apparatus 400 through the network interface 130, to form and fix a required image on the recording medium. As shown in FIG. 2, the controller 110 has an information processor 111, a ROM 112 (Read Only Memory), and a RAM 113 (Random Access Memory). The information processor 111 is configured to process information.

The information processor 111 may be equipped with integrated circuits (IC) including an application specific integrated circuit (ASIC), a microprocessor, or a CPU. The ROM 112 is configured to store a program that realizes, when executed by the information processor 111, each of required functions of the image forming apparatus 100. The RAM 113 is a memory in which a program or data is developed when the information processor 111 realizes each of required functions.

The storage 120 includes a non-volatile memory. The storage 120 is configured with, for example, an IC such as an EEPROM (Electrically Erasable Programmable Read Only Memory) (registered trademark). In the image forming apparatus 100 according to the present embodiment, the storage 120 is configured to store the setting data 121, the setting update time 122, and the update interval information 123.

The setting data 121 is data that indicates settings related to image formation of the image forming apparatus 100. The controller 110 refers to the setting data 121 in the storage 120 in controlling the network interface 130 and the imaging engine 140 to perform required operations of the image forming apparatus 100. The setting data 121 includes information on parameters, reference data, default data, and the like necessary to realize such operations. For example, the controller 110 controls the imaging engine 140 based on the settings represented by the setting data 121, thereby causing the imaging engine 140 to perform image formation in accordance with the settings specified in the setting data 121.

The setting data 121 may also include information regarding access to a particular path, folder, or particular data or file of the server 200 as necessary for a setting updating process. The setting data 121 may also include information indicating an administrator password required to execute the setting updating process.

For example, at least part of various information, that may be included in the setting data 121, is able to be changed by a user of the image forming apparatus 100 as the user directly accesses the image forming apparatus 100, in addition to updating the setting data 121 using the update data 221. Specifically, it may be possible for the user to access the image forming apparatus 100 by operating the information processing apparatus 400 and change the settings of the setting data 121, i.e., the information that may be included in the setting data 121. In such a case, the controller 110 performs a process of changing the information that may be included in the setting data 121 based on a signal representing the above operation which is obtained via the network interface 130.

The controller 110 may perform the process of changing the information that may be included in the setting data 121 based on an input by the user via the operation panel of the image forming apparatus 100. In other words, the operation panel may serve as an input interface through which the user may change the settings of the setting data 121.

The setting update time 122 is information that indicates a time at which the controller 110 is scheduled to update the setting data 121. The update interval information 123 is information that defines an update interval of the setting data 121.

The update interval information 123 may be information specifying the update interval in terms of time intervals, such as "30 days," "7 days" or the like, or in terms of calendar periods, such as "one month," "one week" or the like.

The network interface 130 is a communication interface for the image forming apparatus 100 to connect to external devices through a network. In the setting data management system 1, the image forming apparatus 100 is capable of communicating with the server 200. The image forming apparatus 100 may also be capable of communicating with the information processing apparatus 400.

A clock 150 is configured to measure a current date and time and supply the same to the controller 110. The current date and time may include information on the current time and the current year and month. A specific hardware configuration of the clock 150 does not need to be particularly limited. The clock 150 may be a timer configured by software built into the controller 110.

Server

As shown in FIG. 2, the server 200 has a server controller 210, a server storage 220, and a server interface 230. The server interface 230 is a communication interface for the server 200 to connect to other network terminals through a network. In the example shown in FIG. 2, the server interface 230 is connected to the image forming apparatus 100. Additionally, the server interface 230 may be connected to the information processing apparatus 300. The server storage 220 is a memory configured to store various data. The server controller 210 is configured to control components and execute an operation of the server 200.

The server 200 may allow an external device connected to the network to store data in the server storage 220. The server 200 may transmit data stored in the server storage 220 to external devices connected to the network.

Further, the server 200 may allow a terminal connected to the network to refer to additional information about the data stored in the server storage 220, the additional data including a file name and date and time when the file was created or updated.

The server storage 220 is configured to store the update data 221 in a particular path. The update data 221 contains information used for rewriting at least a part of the various settings of the image forming apparatus 100 defined by the setting data 121.

In the present specification, unless otherwise stated, obtaining and storing processes of the update data in the image forming apparatus 100 and the updating process of the setting data using the update data are performed in succession. As a result, the image forming apparatus 100 is expected to perform the aforementioned obtaining and storing processes and the updating process in this order at approximately the same time as the setting update time. Accordingly, a completion time of the periodic updating process can be regarded as substantially the same time as the setting update time. In addition, a completion time of a non-periodic updating process, which will be described below, can be considered to be approximately the same as the time when the connection between the image forming apparatus 100 and the server 200 starts (i.e., a connection start time).

Periodic Updating Process

At the setting update time, the image forming apparatus 100 obtains the update data 221 from the server 200 and updates the setting data 121 using the update data 221. In the following description, the process by the image forming apparatus 100 for updating the setting data at the setting update time and the process for updating the setting update time are collectively referred to as a "periodic updating process." In other words, the periodic updating process indicates a series of processes, performed by the image forming apparatus 100, to update the setting data 121 as scheduled at the date and time represented by the setting update time 122.

Figure 3:
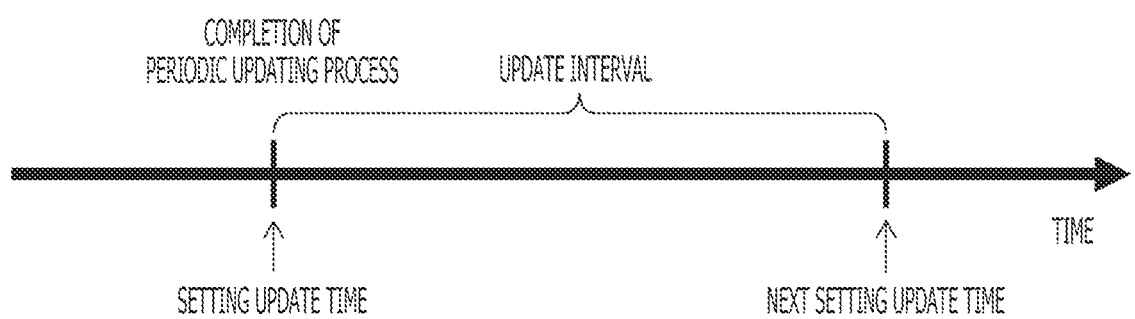
FIG. 3 illustrates how to set a next setting update time when a periodic updating process is executed in the image forming apparatus.

FIG. 3 is a schematic diagram showing how a next setting update time is set when the periodic updating process is performed in the image forming apparatus 100. It is assumed that the image forming apparatus 100 has completed the periodic updating process at the setting update time defined in the setting update time 122 as shown in FIG. 3. In this case, the image forming apparatus 100 determines the next setting update time based on the time represented by the setting update time 122 upon completion of the update of the setting data 121. For example, the image forming apparatus 100 of the present embodiment determines the next setting update time by adding the time corresponding to the update interval to the time indicated by the setting update time 122. In this way, as shown in FIG. 3, the periodic updating process can be periodically performed at the update interval represented by the update interval information 123.

Figure 4:
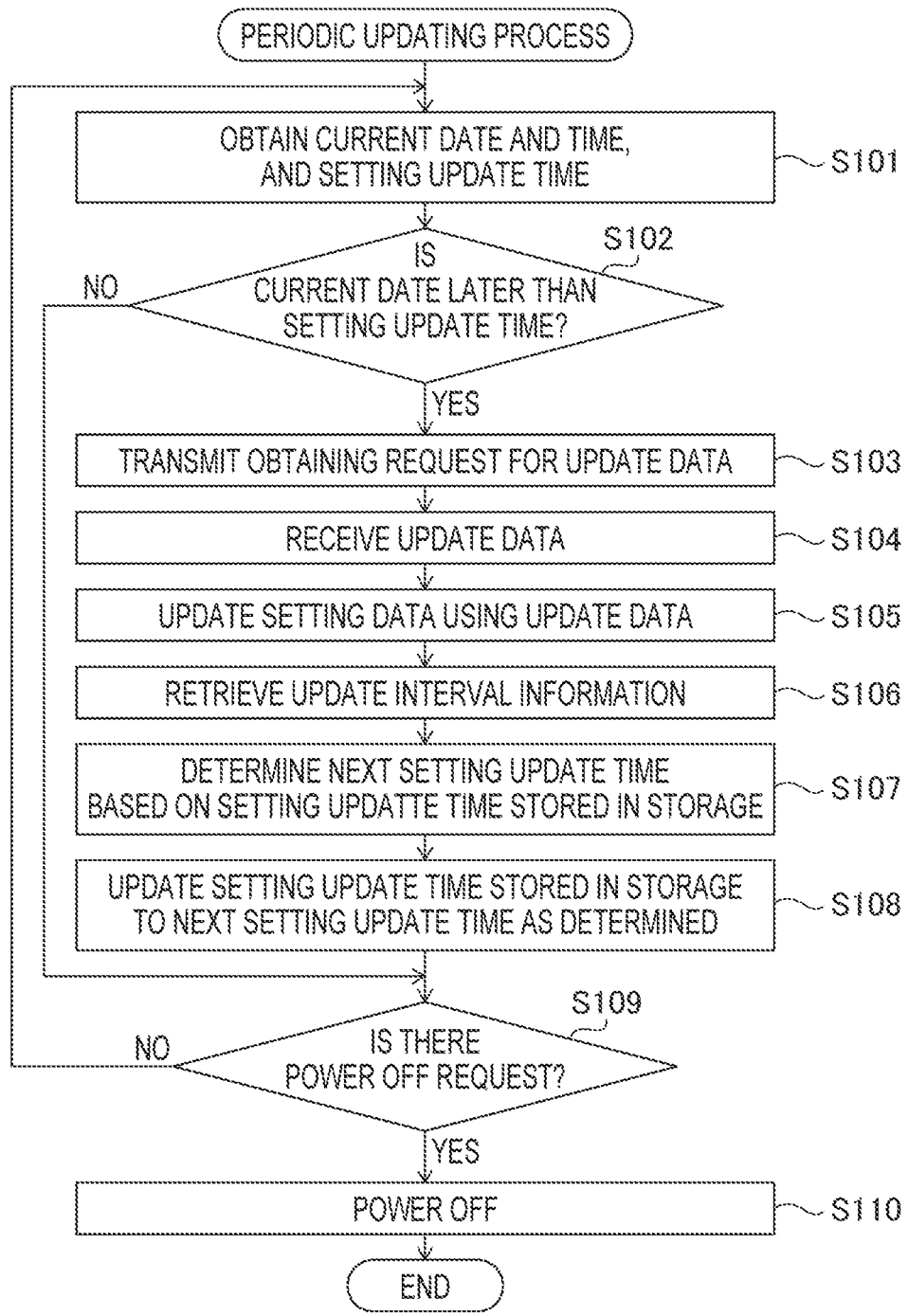
FIG. 4 shows a flowchart illustrating an example of the periodic updating process.

FIG. 4 is a flowchart showing an example of a periodic updating process performed by the image forming apparatus 100. When a power supply of the image forming apparatus 100 is on, S101 to S108 described below are repeated. It is noted that a process performed in S101 to S107 is the periodic updating process. Hereinafter, an operation of the image forming apparatus 100 will be described in accordance with the flowchart shown in FIG. 4.

In S101, the information processor 111 obtains the current date and time from the clock 150. Further, the information processor 111 obtains the setting update time 122 from the storage 120. Thereafter, the control proceeds to S102.

In S102, the information processor 111 compares the obtained current date and time with the setting update time 122. Concretely, the information processor 111 determines whether the current date and time is later than the setting update time indicated by the setting update time 122. When it is determined that the current date and time is later than the setting update time (S102: YES), the control proceeds to S103. When it is determined that the current date and time is not later than the setting update time (S102: NO), the control proceeds to S109.

In S103, the information processor 111 transmits a request for obtaining the update data 221 to the server 200 via the network interface 130. In response to receipt of the obtaining request from the image forming apparatus 100 via the server interface 230, the server controller 210 transmits the update data 221 retrieved from the server storage 220 to the image forming apparatus 100 via the server interface 230.

In S104, the information processor 111 receives the update data 221 via the network interface 130. The information processor 111 may store the received update data 221 in the storage 120. In S105, the information processor 111 updates the setting data 121 stored in the storage 120 using the update data 221. In S106, the information processor 111 retrieves the update interval information 123 from the storage 120.

In S107, the information processor 111 determines the next setting update time based on the setting update time 122 obtained in step S101, i.e., the setting update time 122 stored in the storage 120. For example, the information processor 111 determines the next setting update time by adding a time corresponding to the update interval represented by the update interval information 123 to the setting update time represented by the setting update time 122.

For example, it is assumed that the setting update time is "Jan. 1, 2020, 0:00:00" and the update interval is set to 10 days. In such a case, the information processor 111 sets the next setting update time to "Jan. 11, 2020, 0:00:00" which is calculated by adding the time equal to one period of the update interval, or 10 days, to the setting update time.

When the update interval is defined on a calendar period basis, the information processor 111 may identify the amount of time to be added to the setting update time based on both the setting update time and the update interval. Concretely, for example, when the update interval is one month, the information processor 111 may identify one of 28, 29, 30 and 31 days as the update interval based on the date represented by the setting update time 122. Then, the information processor 111 may determine the next setting update time by adding the amount of the identified number of days to the setting update time. When the next setting update time is determined by the information processor 111, the control proceeds to S108.

In S108, the information processor 111 updates the setting update time 122 stored in the storage 120 to the next setting update time that has been determined in S107.

In S109, the information processor 111 determines whether there is a power-off request for the image forming apparatus 100. The power-off request is generated, for example, by a manual operation of the user of the image forming apparatus 100. When there is no power-off request (S109: NO), the control returns to S101 and the subsequent steps are repeated. When there is a power-off request (S109: YES), the control proceeds to S110.

In S110, the information processor 111 performs a process to power off the image forming apparatus 100, and the periodic updating process shown in FIG. 4 is terminated.

According to the aforementioned configuration, the image forming apparatus 100 is capable of determining the next setting update time such that, when the setting data 121 is updated as scheduled at the setting update time, the interval between the previous setting update time and the next setting update time is the update interval indicated by the update interval information 123.

Non-Periodic Updating Process

The update data 221 is stored in the server storage 220. Therefore, when the image forming apparatus 100 is not connected to the server 200, the image forming apparatus 100 is in a state where it is unable to obtain the update data 221. In this state, when the current time is equal to the setting update time, the update data 221 cannot be obtained and the setting data 121 cannot be updated using the new update data 221. In other words, the image forming apparatus 100 cannot perform the periodic updating process.

Therefore, when the image forming apparatus 100 according to the setting data management system 1 is unable to perform the periodic updating process at the setting update time, the image forming apparatus 100 performs obtaining the update data 221 and updating the setting data 121 at a timing different from a timing when the aforementioned periodic updating process is performed. Concretely, if a time when the image forming apparatus 100 is connected to the server 200 is later than the time represented by the setting update time 122, the image forming apparatus 100 obtains the update data 221 and updates the setting data 121. In this case, the image forming apparatus 100 updates the setting update time 122 to the next setting update time in response to the completion of the update of the setting data 121. Hereafter, a process by the image forming apparatus 100 for updating the setting data and the setting update time at a timing different from a timing when the periodic updating process is performed is collectively referred to as the "non-periodic updating process.

Figure 5:
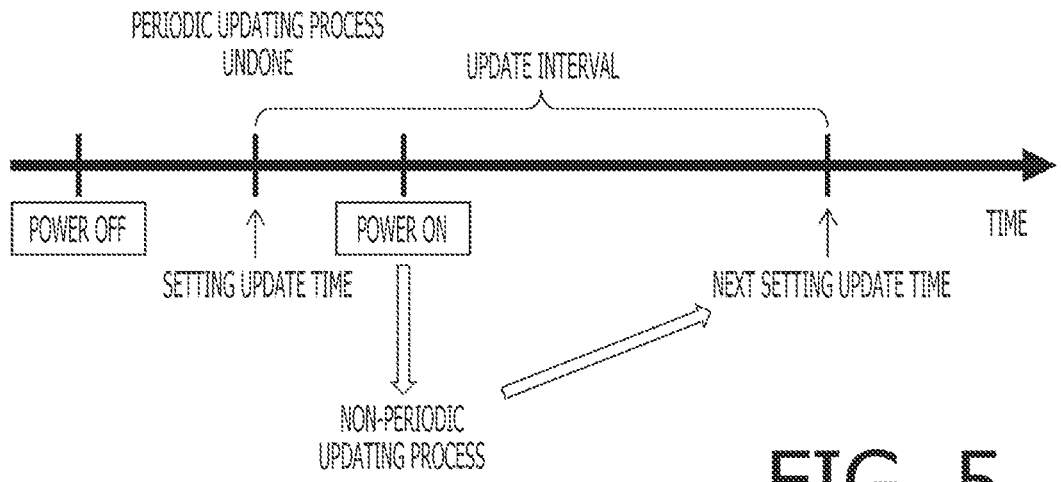
FIG. 5 illustrates how to set a next setting update time when the periodic updating process has not been executed in the image forming apparatus.

FIG. 5 is a schematic diagram showing how the next setting update time is set in the case where the periodic updating process could not be performed in the image forming apparatus 100. For example, if the setting update time has passed while the power of the image forming apparatus 100 is off, as shown in FIG. 5, the connection between the image forming apparatus 100 and the server 200 is not established because the image forming apparatus 100 is not in operation, and thus the periodic updating process cannot be executed.

In this case, the image forming apparatus 100 performs the non-periodic updating process when the connection with the server 200 is established. For example, as shown in FIG. 5, when the image forming apparatus 100 is powered on, the connection between the image forming apparatus 100 and the server 200 is re-established.

As shown in FIG. 5, when the server 200 is connected to the image forming apparatus 100 (i.e., when the image forming apparatus 100 is powered on), the image forming apparatus 100 performs the non-periodic updating process. Thus, when the connection between the image forming apparatus 100 and the server 200 is re-established as the image forming apparatus 100 is powered on, the setting data 121 is updated with use of the latest update data 221, and the setting update time 122 is updated to the next setting update time.

Concretely, the image forming apparatus 100 determines the next setting update time based on the time indicated by the setting update time 122 in response to the completion of the update of the setting data 121. For example, the image forming apparatus 100 according to the present embodiment determines the next setting update time by adding a time corresponding to the update interval to the time indicated by the setting update time 122.

Therefore, as shown in FIG. 5, the periodic updating process can be restarted at the update interval defined by the update interval information 123 even if the periodic updating process is failed to be performed.

Figure 6:
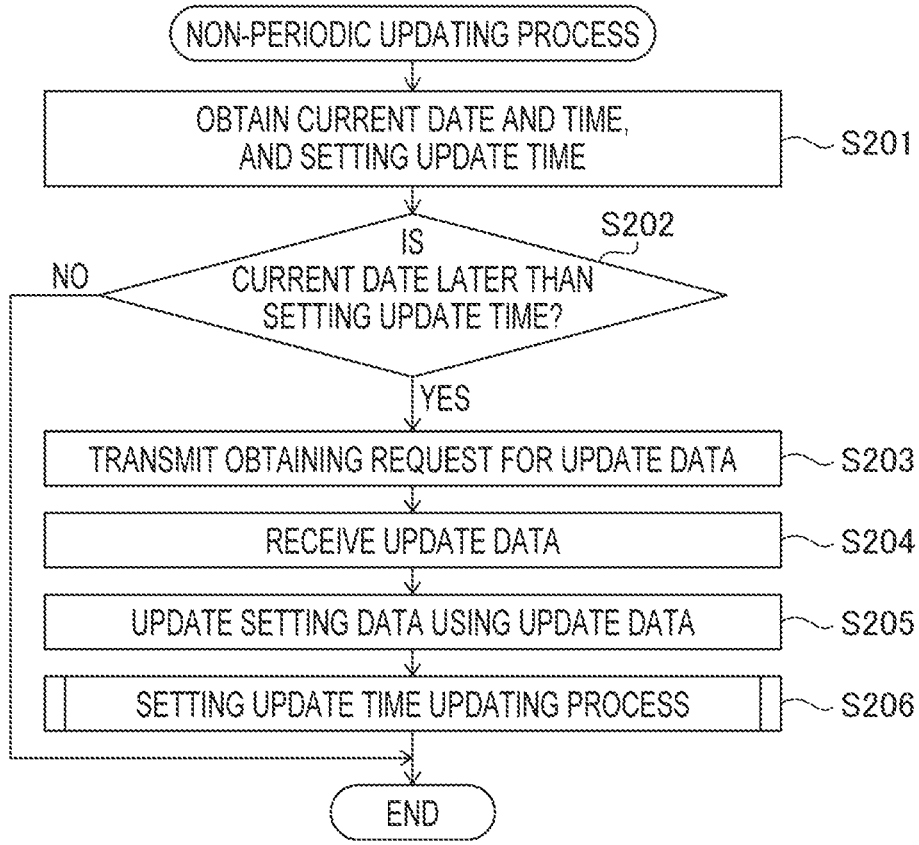
FIG. 6 shows a flowchart illustrating an example of a non-periodic updating process.

FIG. 6 is a flowchart illustrating an example of the non-periodic updating process. The non-periodic updating process shown in FIG. 6 is started when the connection between the image forming apparatus 100 and the server 200 is established. Since steps S201 to S205 in FIG. 6 are the same as steps S101 to S105 in FIG. 4, respectively, the description thereof will not be repeated. After the update of the setting data 121 in S205 is completed, the control proceeds to S206.

In S206, the information processor 111 performs a setting update time updating process. The setting update time updating process is a process in which the information processor 111 determines the next setting update time and updates the setting update time 122 in the storage 120 using the determined next setting update time. The setting update time updating process is described in detail, referring to FIG. 7.

Figure 7:
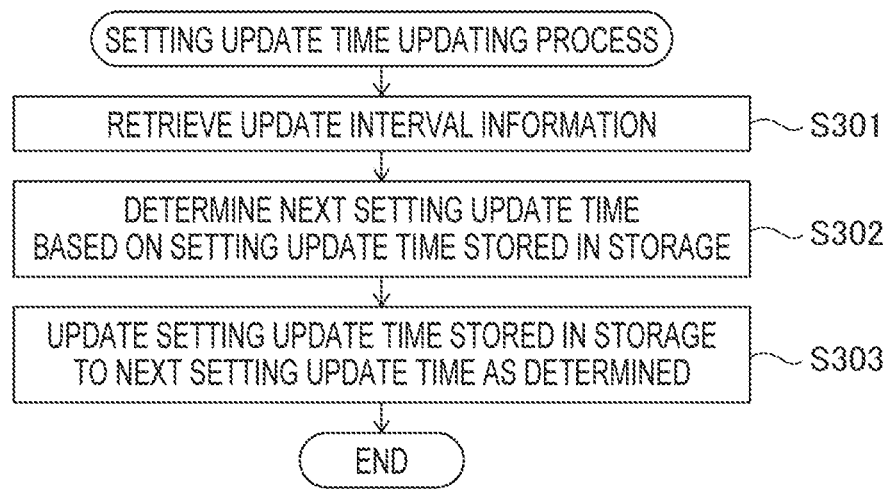
FIG. 7 shows a flowchart illustrating an example of an updating process to update the setting update time.

FIG. 7 is a flowchart illustrating an example of the setting update time updating process.

In S301, the information processor 111 retrieves the update interval information 123 from the storage 120.

In S302, the information processor 111 determines the next setting update time based on the setting update time 122 stored in the storage 120. For example, the information processor 111 determines the next setting update time by adding a time corresponding to the update interval represented by the update interval information 123 to the setting update time represented by the setting update time 122.

The method of calculating the time corresponding to one period of the update interval is the same as in S107 of the flowchart shown in FIG. 4. However, in S302, the information processor 111 adds the time corresponding to the period of n times of the update interval to the setting update time, and sets the thus calculated time as the next setting update time. For example, n is the smallest integer such that (setting update time+a time corresponding to the update interval*n) is a time later than the current date and time. In this way, the information processor 111 can determine a future time as the next setting update time.

For example, it is assumed that the setting update time is "Jan. 1, 2020, 0:00:00" and the update interval is set to 10 days. In this case, the information processor 111 first adds a time corresponding to one period of the update interval, i.e., 10 days to the setting update time. Next, the information processor 111 compares the calculated time with the current date and time. If the calculated time, "Jan. 11, 2020, 0:00:00," is a time later than the current time, i.e., a time in the future, the information processor 111 determines the calculated time as the next setting update time. On the other hand, if the calculated time is a time before the current date and time, i.e., a time in the past, the information processor 111 further adds a time corresponding to one period of the update interval to the calculated time.

Then, the information processor 111 compares the time after the second addition, i.e., "Jan. 21, 2020, 0:00:00," with the current date and time. If the time after the second addition is the time in the future, the information processor 111 sets the time after the second addition as the next setting update time. If the time after the second addition is the time in the past, the information processor adds another 10 days to the time after the second addition. In this way, the information processor 111 may repeatedly add the time corresponding to one period of the update interval and determine whether the time after the addition is a future time or not. When the time after the addition becomes a future time, the time after the addition may be determined as the next setting update time.

According to the above configuration, even when the image forming apparatus 100 and the server 200 have been unconnected for a long time for some reason, the information processor 111 can properly set the next setting update time. Once the next setting update time is determined, the control proceeds to S303.

In S303, the information processor 111 updates the setting update time 122 stored in the storage 120 to the next setting update time determined in S302, and terminates the process shown in FIG. 7.

According to the processes described above, the image forming apparatus 100 updates the setting data 121 at the setting update time. If the current time is later than the setting update time at the time when the connection with the server 200 is established, the image forming apparatus 100 obtains the update data 221, updates the setting data 121, and updates the setting update time 122 at the time when the connection with the server 200 is established.

Therefore, the image forming apparatus 100 can perform an image processing based on the latest possible setting data. That is, according to the setting data management system 1 of the present embodiment, the settings of the image forming apparatus 100 can be kept as up-to-date as possible.

The non-periodic updating process shown in FIG. 6 is started when the connection between the image forming apparatus 100 and the server 200 is established. It is noted, however, the conditions that trigger establishment of the connection are not limited to a particular condition.

For example, the image forming apparatus 100 may cause the network interface 130 and the server interface 230 to be connected with each other in response to a fact that the power of the image forming apparatus 100 or the server 200 has been changed from an off state to an on start. According to the above configuration, if the updating of the setting data 121 could not be performed as the image forming apparatus 100 was powered off, when the image forming apparatus 100 is powered on, the image forming apparatus 100 and the server 200 are connected with each other and the setting data 121 can be updated. Therefore, the image forming apparatus 100 can keep the settings of its own device as up-to-date as possible.

For another example, the image forming apparatus 100 may cause the network interface 130 and the server connection 230 to connect with each other in response to a communication error having been occurred between the network interface 130 and the server 200, and then, the communication error being recovered. According to the above configuration, the communication between the image forming apparatus 100 and the server 200 is recovered and the setting data 121 is updated when the communication error is recovered when the communication error had occurred due to, for example, a faulty communication line or a server down. Therefore, the image forming apparatus 100 can keep the settings of its own device as up-to-date as possible.

Second Embodiment

In the setting data management system 1 according to the present disclosures, if the setting data 121 is updated when the controller 110 between the image forming apparatus 100 and the server 200 is established, the controller 110 of the image forming apparatus 100 may determine the next setting update time based on the connection start time in response to the completion of the update. Then, the controller 110 may update the setting update time 122 to the determined next setting update time.

Hereinafter, a second embodiment according to the present disclosures will be described below. For convenience of explanation, components having the same functions as the components described in the above embodiment are assigned with the same reference numbers and explanation thereof will not be repeated. The same applies to all the following embodiments and modifications.

The image forming apparatus 100 according to the second embodiment differs from the image forming apparatus 100 according to the first embodiment in a method of determining the next setting update time in the setting update time updating process. Concretely, the setting update time updating process in the image forming apparatus 100 according to the second embodiment differs from the setting update time updating process shown in S302 of FIG. 7.

The information processor 111 according to the second embodiment is configured to determine the next setting update time based on the connection start time instead of the setting update time in S302 of FIG. 7. The connection start time is the time at which the connection between the network interface 130 and the server interface 230 is established. The connection start time may include at least one of the year, month and day. For example, the connection start time includes the date (i.e., the year, month and day) and time.

More concretely, the information processor 111 according to the second embodiment is configured to obtain the current date and time (i.e., the connection start time) from the clock 150 when the connection between the network interface 130 and the server interface 230 is established. Then, at the timing of S302 of FIG. 7, the information processor 111 determines the next setting update time by adding the time corresponding to the update interval to the obtained connection start time. The method of calculating the time corresponding to one period of the update interval is the same as in S107 of FIG. 4. The information processor 111 may determine the time obtained by, for example, adding the time corresponding to one period of the update interval to the connection start time as the next setting update time.

According to the above configuration, once the execution of the periodic updating process is failed, the periodic updating process can be restarted at the update interval defined by the update interval information 123, based on the time when the connection between the image forming apparatus 100 and the server 200 was established.

Third Embodiment

In the setting data management system 1 according to the present disclosures, when the setting update time indicated by the setting update time 122 is reached while image processing (e.g., image formation) is being performed by the image processor (e.g., the imaging engine 140), the controller 110 of the image forming apparatus 100 may update the setting data 121, after the image processing is completed, using one of the update data 221 obtained from the server 200 in advance or the update data 221 obtained from the server 200 after the image processing is completed.

Hereinafter, a third embodiment according to the present disclosures will be described with reference to FIG. 8. The controller 110 according to the third embodiment is configured to store an update flag inside the controller 110 itself or in the storage 120. The update flag is a flag indicating whether the setting data 121 is to be updated. How the update flag is switched between on and off will be described in detail later. The image forming apparatus 100 according to the third embodiment differs from the image forming apparatus 100 according to the first embodiment in that the setting data 121 can be updated after image formation is completed, by switching this update flag, if the setting update time is reached during image formation.

Figure 8:
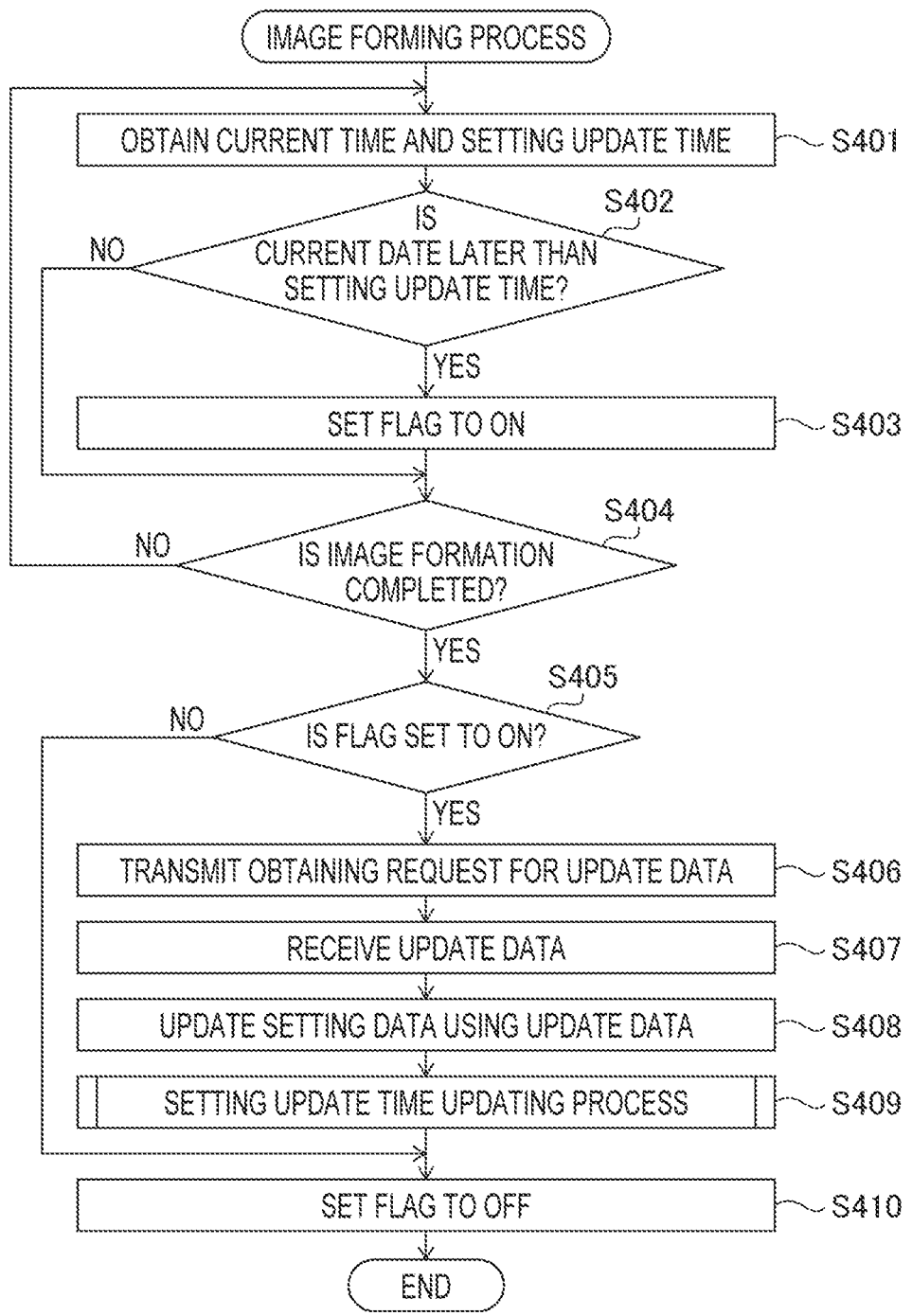
FIG. 8 shows a flowchart illustrating an example of a process performed by an image forming apparatus according to a second embodiment of the present disclosures.

FIG. 8 shows an example of a flowchart indicating processes executed by the image forming apparatus 100 according to the present embodiment. The flowchart starts at a timing when the image forming process is started.

In S401, the information processor 111 obtains the current date and time from the clock 150. Further, the information processor 111 obtains the setting update time 122 from the storage 120. Thereafter, the control proceeds to S402.

In S402, the information processor 111 compares the obtained current date and time with the setting update time 122. Concretely, the information processor 111 determines whether the current date and time is later than the setting update time indicated by the setting update time 122. When it is determined that the current date and time is later than the setting update time (S402: YES), the control proceeds to S403. When it is determined that the current date and time is not later than the setting update time (S402: NO), the control proceeds to S404.

In S403, the information processor 111 sets the update flag to on. The control then proceeds to S404.

In S404, the information processor 111 determines whether the image formation by the imaging engine 140 has been completed. When the image formation has been completed (S404: YES), the control proceeds to S405. When the image formation has not been completed (S404: NO), the control returns to S401 and the processes are repeated.

In S405, the information processor 111 determines whether the update flag is on. When the flag is on (S405: YES), the control proceeds to S406. When the flag is not on (S405: NO), the control proceeds to step S410.

Since the processes of S406 to S408 are the same as those of S203 to S205 in FIG. 6, the description thereof will not be repeated. After execution of S408, the control proceeds to S409.

In S409, the information processor 111 performs the setting update time updating process. The setting update time updating process performed here may be the setting update time updating process described either in the first embodiment or in the second embodiment. Next, the control proceeds to step S410.

In S410, the information processor 111 sets the update flag to off, and terminates the process shown in FIG. 8.

According to the above processes, if the setting update time is reached during the image formation, the image forming apparatus 100 can update the setting data 121 after the completion of the image formation. Accordingly, it is possible to prevent that the settings to be applied to the image from being changed due to the updating of the setting data 121 during image formation. For example, the image forming apparatus 100 can prevent the resolution of printing, an image layout and the like from being changed in the middle of printing of a plurality of sheets as the setting data 121 is updated during the printing of the plurality of sheets.

Forth Embodiment

The image forming apparatus 100 of the setting data management system 1 according to the present disclosures may check version of the update data 221 before obtaining of the update data 221 when performing the non-periodic updating process. The image forming apparatus 100 may obtain the update data 221 and update the setting data 121 when is older than the version of the update data 221. Further, when version of the setting data 121 the version of the update data 21 is equal to or newer than the version of the update data 221, the image forming apparatus 100 may not obtain the update data 221.

Hereinafter, a fourth embodiment according to the present disclosures will be described with reference to FIG. 9. The update data 221 for the fourth embodiment includes information indicating the version of itself. Hereafter, the information indicating the version is also referred to simply as "version information." In addition, the setting data 121 according to the fourth embodiment also includes its own version information. The server controller 210 of the server 200 can identify the version of the update data 221 by retrieving the version of the update data 221. Further, the information processor 111 of the image forming apparatus 100 can identify the version of the setting data 121 by retrieving the version information of the setting data 121.

The image forming apparatus 100 according to the fourth embodiment is configured to transmit an obtaining request for obtaining the version information of the update data 221 to the server 200. Upon receiving the obtaining request, the server 200 retrieves the version information of the update data 221 from the update data 221 in the server storage 220, and transmits the version information to the image forming apparatus 100 via the server interface 230.

Figure 9:
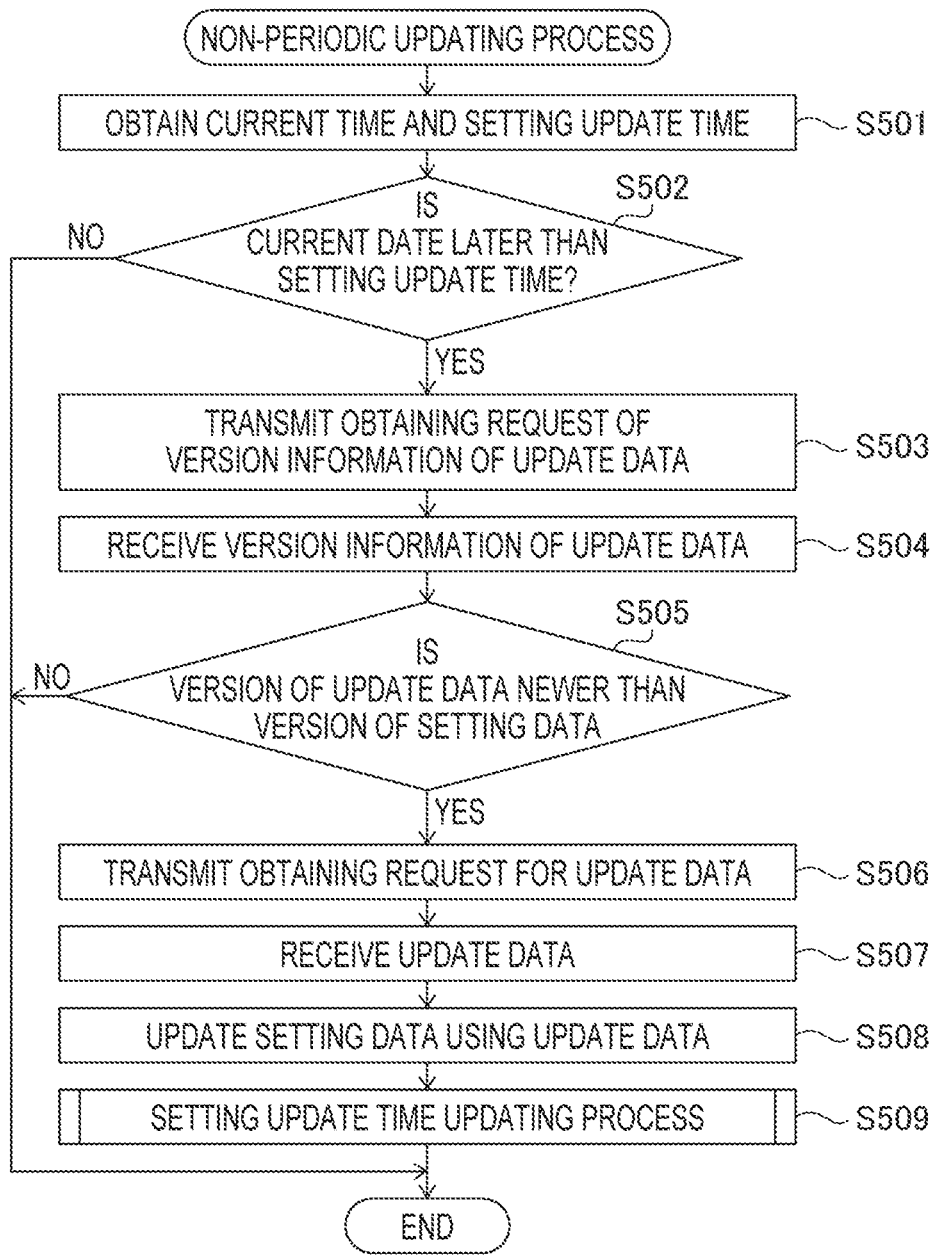
FIG. 9 shows a flowchart illustrating another example of the non-periodic updating process.

FIG. 9 is a flowchart illustrating another example of the non-periodic updating process. The process shown in FIG. 9 is started when the connection between the image forming apparatus 100 and the server 200 is established as in the first embodiment shown in FIG. 6.

In S501, the information processor 111 obtains the current date and time from the clock 150. Further, the information processor 111 obtains the setting update time 122 from the storage 120. Thereafter, the control proceeds to S502.

In S502, the information processor 111 compares the obtained current date and time with the setting update time 122. Concretely, the information processor 111 determines whether the current date and time is later than the setting update time indicated by the setting update time 122. When it is determined that the current date and time is later than the setting update time (S502: YES), the control proceeds to S503. When it is determined that the current date and time is not later than the setting update time (S502: NO), the control terminates the process shown in FIG. 9.

In S503, the information processor 111 transmits an obtaining request for obtaining version information of the update data to the server 200 via the network interface 130. Upon receiving the obtaining request from the image forming apparatus 100 via the server interface 230, the server controller 210 transmits the version information of the update data retrieved from the server storage 220 to the image forming apparatus 100 via the server interface 230. Next, the control proceeds to S504.

In S504, the information processor 111 receives the version information of the update data via the network interface 130. The information processor 111 may be configured to store the received version information in the storage 120. The control then proceeds to S505.

In S505, the information processor 111 compares the version of the update data identified based on the received version information and the version of the setting data 121. Concretely, the information processor 111 determines whether the version of the setting data is smaller (i.e., the version is older) than the version of the update data. When the version is smaller (S505: YES), the control proceeds to S506. When the version is the same or larger (S505: NO), the process shown in FIG. 9 is terminated.

Since steps S506 to S508 in FIG. 6 are the same as steps S203 to S205 in FIG. 6, respectively, the description thereof will not be repeated. After the update of the setting data 121 in S505 is completed, the control proceeds to S509.

In S509, the information processor 111 performs the setting update time updating process. The setting update time updating process performed here may be the setting update time updating process described either in the first embodiment or in the second embodiment. After execution of S509, the process shown in FIG. 9 is terminated.

According to the above process, the image forming apparatus 100 according to the fourth embodiment obtains the update data 221 and updates the setting data 121 when the version of the setting data 121 is older than the latest one. Accordingly, the processing load on the image forming apparatus 100 and the server 200 for exchanging the update data 221 can be reduced. In addition, the amount of data to be exchanged between the image forming apparatus 100 and the server 200 is smaller for the version information of the update data than the update data 221 itself. Therefore, according to the aforementioned process, the image forming apparatus 100 can reduce the communication capacity between the image forming apparatus 100 and the server 200.

Fifth Embodiment

At least part of information included in the setting data 121 according to the present disclosures may be changed by a user of the image forming apparatus 100 directly accessing the image forming apparatus 100 in addition to updating the setting data 121 using the update data 221. For example, the use can access to the image forming apparatus by operating the information processing apparatus 400 and change settings of the setting data 121 (i.e., information included in the setting data 121). The controller 110 is configured to perform a changing process of changing information which can be included in the setting data based on a signal of the operating received through the network interface 130.

It is noted that the controller 110 may perform the changing process based on input through an operation panel of the image forming apparatus 100. The operation panel can be considered as an input interface through which the user change setting of the setting data 121.

Further, according to aspects of the present disclosure, the storage 120 may store a change history log and version information. FIG. 10A and FIG. 10B indicates the change history log and the version information in table forms, respectively.

The change history log is a log indicating an execution history of the changing process. As shown in FIG. 10A, the change history log stores information about changes to various information, in chronological order, that may be included in the setting data 121 by the changing process. In the example of FIG. 4, the information includes the date and time when the changing process was executed, the item that was changed, the parameter that was changed in the item, and information indicating how the parameter was changed before and after the changing process.

If the item changed by the changing process is a particular item, the controller 110 stores information on the changing process in the change history log. In other words, the controller 110 does not store the information on the changing process in the change history log when the item changed by the changing process is an item other than the particular item.

The version information is a record including information on the latest update data 221 after the setting update is applied to the updated data 221 and the setting data 121 is update. As shown in FIG. 10B, the version information includes information indicating a file name of the applied update data 221 and information indicating the update date of the applied update data 221.

Figure 11:
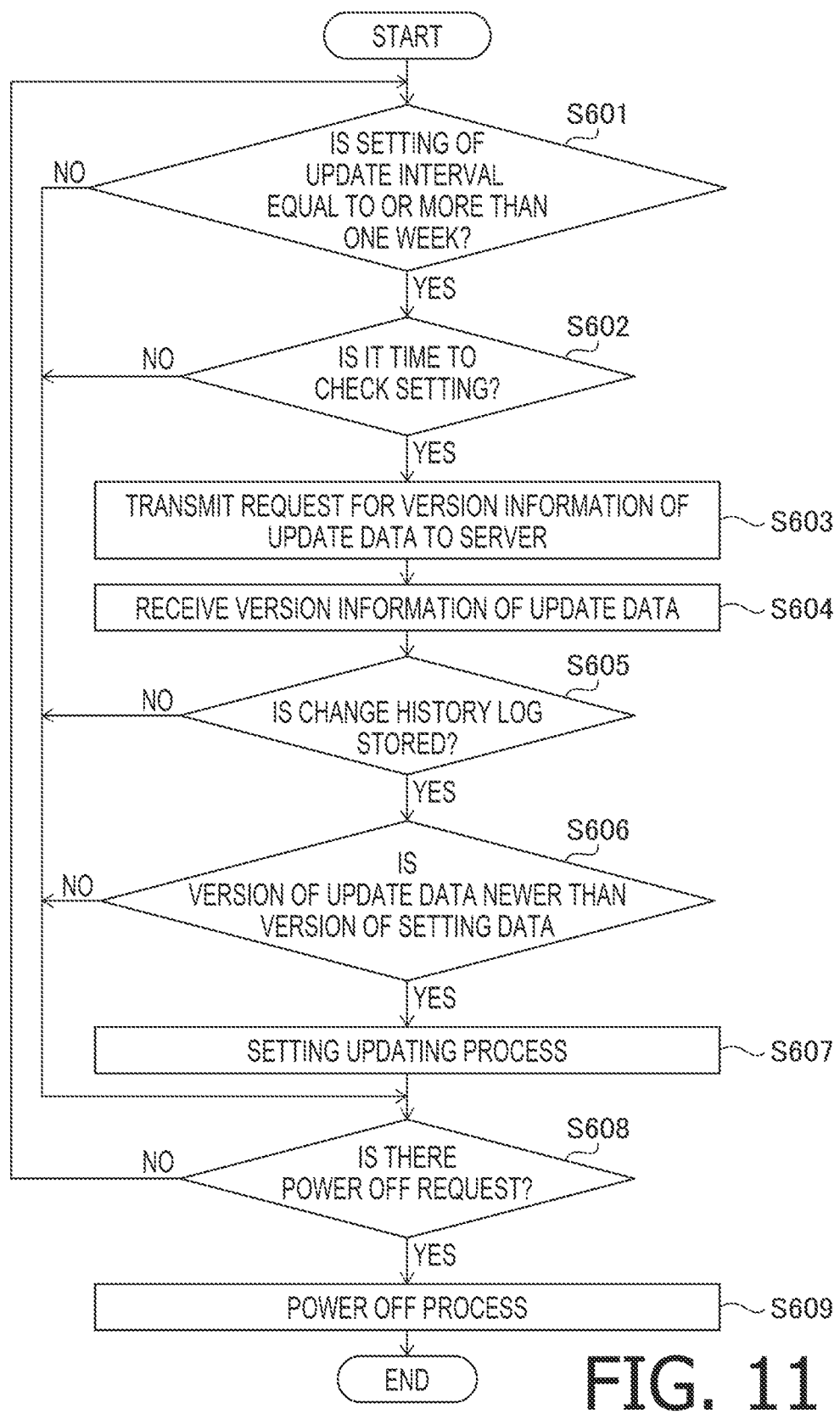
FIG. 11 shows a flowchart illustrating a further example of a process performed by the image forming apparatus.

FIG. 11 is a flowchart illustrating characteristic operations performed by the image forming apparatus 100 according to a fifth embodiment. When the image forming apparatus 100 is powered on, a process shown in FIG. 11 is executed. In the following description, the characteristic operations of the image forming apparatus 100 according to the fifth embodiment will be described referring to the flowchart shown in FIG. 11.

In S601, the information processor 111 determines whether or not the update interval represented by the update interval information 123 is one week or more. When it is determined that the update interval is one week or more (S601: YES), the control proceeds to S602. Otherwise (S601: NO), the control proceeds to step S608.

In S602, the information processor 111 refers to the setting update time 122 in the storage 120, and compares the current date and time with the setting update time 122. Concretely, the information processor 111 determines whether the current date and time is a time to perform the setting updating process (i.e., the current date and time is the setting update time 122). When the current date and time is a time to perform the setting updating process (S602: YES), the control proceeds to S603, otherwise the control proceeds to S608.

In S603 and S604, the same processes as those of the processes in S503 and S504 indicated in FIG. 9 are executed, respectively.

In S605, the information processor 111 determines whether the change history log is stored in the storage 120. The process in S605 is an example of a change determining process. When the information processor 111 determines that the change history log is stored in the storage 120 (S605: YES), the control proceeds to S606, otherwise the control proceeds to S608.

In S606, the same process as that of S505 indicated in FIG. 9 is executed. When the version is smaller (S606: YES), the control proceeds to S607. When the version is the same or larger (S606: NO), the control proceeds to S608.

In S607, the information processor 111 executes a setting update process. In the setting update process, the processes of S506, S507 and S508 of FIG. 9 are executed. When executing process same as the process S508, the version information of the setting data is updated with the version information of the update data. Then, the control proceeds to S608.

In S608, the information processor 111 determines whether there is a request to turn off the power by a manual operation, by the user, of the image forming apparatus 100. When it is determined that there is a request to turn off the power (S608: YES), the control proceeds to S609. Otherwise (S608: NO), the control returns to S601.

In S607, the information processor 111 performs a process to power of the image forming apparatus 100. Thereafter, the information processor 111 terminates the process show in FIG. 11.

The setting of the setting data 121 stored in the storage 120 may be changed by the user of the image forming apparatus 100. There is a possibility that the changed setting would be unintended by an administrator of the image forming apparatus 100. When the update interval is relatively long (e.g., one week, one month, etc.), there is a possibility that the changed setting is maintained for a long time. On the other hand, when the update interval is relatively short (e.g., one day), even if the setting is unintendedly changed, an execution timing of the next updating process will come soon, and a state where the setting is kept changed will be resolved in a relatively short time. Therefore, when the update interval is relatively short, it is less necessary to execute the change determining process.

According to the above configuration, when the update interval is set to be less than a particular interval, the change determining process is not performed, thus preventing the change determining process that is not necessary from being performed. When the update interval is longer than the particular interval, the change determining process is performed, and the setting data 121 is updated by obtaining the update data 221 from the server 200. The above configuration prevents settings that are not intended by the administrator from maintained for a long period of time.

Whether the process shown in FIG. 11 and the process shown in FIG. 9 are both performed or only one of them is performed is determined like the update interval information 123, and the process shown in FIG. 11 and the process shown in FIG. 9 are executed only when they are set to be performed, respectively.

Example of Software Implementation

Each control block of the image forming apparatus 100 may be realized by a logic circuit (hardware) formed in an integrated circuit (e.g., an IC chip), or may be realized by software.

In the latter case (i.e., when each control block is realized by software), the image forming apparatus 100 is equipped with a computer that executes the instructions of a program, which is software that realizes each function. This computer has, for example, one or more processors, and also has a computer-readable recording medium that stores the above program. The aspects of the present disclosures are realized when the above processor retrieves the above program from the above recording medium and executes the same in the above computer. As the above processor, for example, a CPU (Central Processing Unit) can be used. As the above recording medium, a "non-temporary tangible medium" (e.g., a ROM (Read Only Memory), etc.) as well as a tape, a disk, a card, a semiconductor memory, a programmable logic circuit, etc., can be used. It may also be further equipped with a RAM (Random Access Memory) or the like to develop the above program. The above program may be supplied to the above computer via any transmission medium capable of transmitting the program (communication network, broadcast wave, etc.). One aspect of the present disclosures may also be realized in the form of a data signal embedded in a carrier wave, in which the above program is embodied by electronic transmission.

The present disclosures need not be limited to the configurations of the embodiments described above, but various modifications are possible within the scope indicated in the claims, and embodiments obtained by combining the technical means disclosed in the different embodiments are also included in the technical scope of the present disclosures.

What is claimed is:

1. An image processing apparatus, comprising:
an image processor;
a storage;
a network interface; and
a controller,
wherein the controller is configured to perform;
updating, at setting update time, setting data stored in the storage using update data obtained from a server which is connected to the image processing apparatus via the network interface, the storage being configured to store the setting data, the controller being configured to control the image processor in accordance with a setting represented by the setting data, the server storing the update data to be used to update the setting data, the storage storing the setting update time representing a time at which the controller is to update the setting data, the updated setting data being used by the controller to control the image processor after completion of update of the setting data;
updating the setting update time in response to completion of update of the setting data at the setting update time;
determining, at a connection start time when a connection between the network interface and the server is established, whether the connection start time is later than the setting update time;
when the connection start time is later than the setting update time, updating the setting data using the update data obtained from the server at the connection start time; and
when the connection start time is not later than the setting update time, not updating the setting data at the connection start time.

2. The image processing apparatus according to claim 1, wherein the controller is further configured to perform:
in response to the image processing apparatus being powered on, causing the network interface to start connecting with the server; and
determining, at the connection start time, whether the connection start time is later than the setting update time.

3. The image processing apparatus according to claim 1, wherein the controller is further configured to perform:
in response to an occurrence of a communication error between the network interface and the server, and a restoration of the communication error thereafter, causing the network interface to connect with the server; and
determining, at the connection start time, whether the connection start time is later than the setting update time.

4. The image processing apparatus according to claim 1, wherein the controller is further configured to perform:
in a case where the setting update time is reached when an image processing is performed by the image processor, updating the setting data, after the image processing is completed, using one of the update data obtained from the server in advance and the update data to be obtained from the server after the image processing is completed.

5. The image processing apparatus according to claim 1, wherein the controller is further configured to perform:
determining whether the connection start time is later than the setting update time when the network interface starts connecting with the server;
in a case where the connection start time is later than the setting update time, obtaining version information of the update data from the server;
comparing a version of the update data indicated by the version information with a version of the setting data stored in the storage;
in a case where the version of the update data is older than the version of the setting data, obtaining the update data from the server and updating the setting data after the comparing;
in a case where the version of the setting data is equal to or newer than the version of the update data, not obtaining the update data and not updating the setting data after the comparing.

6. The image processing apparatus according to claim 1, wherein the controller is further configured to perform:
in response to completion of the updating of the setting data at the setting update time, determining a next setting update time based on the setting update time stored in the storage; and
updating the setting update time stored in the storage to the next setting update time as determined.

7. The image processing apparatus according to claim 1, wherein the controller is further configured to perform:
in a case where the setting data is updated at the connection start time, in response to completion of the updating of the setting data, determining a next setting update time based on the setting update time stored in the storage; and
updating the setting update time stored in the storage to the next setting update time as determined.

8. The image processing apparatus according to claim 1, wherein the controller is further configured to perform:
in a case where the setting data is updated at the connection start time, in response to completion of the updating of the setting data, determining a next setting update time based on the connection start time; and
updating the setting update time stored in the storage to the next setting update time as determined.

9. The image processing apparatus according to claim 1, wherein the controller is configured to perform:
updating the setting data stored using the update date obtained from the server through the network interface at a particular updating interval set in advance;
determining whether the setting data is changed by a user during the particular updating interval; and
updating the setting data using the update data when determining that the setting data is changed by the user during the particular updating interval.

10. The image processing apparatus according to claim 1, wherein the controller is configured to perform:
in a case where the particular updating interval is set to equal to or longer than a specific period, determining whether the setting data is changed by the user during the particular updating interval; and
in a case where the particular updating interval is set to shorter than the specific period, not determining whether the setting data is changed by the user during the particular updating interval.

11. A setting data management system comprising:
a server;
an image processor;
a storage;
a network interface; and
an image processing apparatus including a controller,
wherein the controller is configured to perform;
updating, at setting update time, setting data stored in the storage using update data obtained from the server which is connected to the image processing apparatus via the network interface, the storage being configured to store the setting data, the controller being configured to control the image processor in accordance with a setting represented by the setting data, the server storing the update data to be used to update the setting data, the storage storing the setting update time representing a time at which the controller is to update the setting data, the updated setting data being used by the controller to control the image processor after completion of update of the setting data;
updating the setting update time in response to completion of update of the setting data at the setting update time;
determining, at a connection start time when a connection between the network interface and the server is established, whether the connection start time is later than the setting update time;
when the connection start time is later than the setting update time, updating the setting data using the update data obtained from the server at the connection start time; and
when the connection start time is not later than the setting update time, not updating the setting data at the connection start time.

12. An image processing apparatus, comprising:
an image processor;
a storage;
a network interface; and
a controller,
wherein the controller is configured to perform;
updating setting data stored in the storage using update data obtained from the server which is connected to the image processing apparatus via the network interface at a particular updating interval set in advance, the storage being configured to store the setting data, the controller being configured to control the image processor in accordance with a setting represented by the setting data, the server storing the update data to be used to update the setting data, the updated setting data being used by the controller to control the image processor after completion of update of the setting data;
determining whether the setting data is changed by a user during the particular updating interval; and
updating the setting data using the update data when determining that the setting data is changed by the user during the particular updating interval.

13. The image processing apparatus according to claim 12, wherein the controller is configured to perform:
in a case where the particular updating interval is set to equal to or longer than a specific period, determining whether the setting data is changed by the user during the particular updating interval; and
in a case where the particular updating interval is set to shorter than the specific period, not determining whether the setting data is changed by the user during the particular updating interval.

* * * * *